D. E. KEMPSTER.
HANDLE OR BAIL MAKING MACHINE.
APPLICATION FILED NOV. 6, 1912.

1,070,696.

Patented Aug. 19, 1913.

8 SHEETS—SHEET 3.

WITNESSES
Horace A. Crossman
Carl L. Choate.

INVENTOR
Daniel E. Kempster
BY
Emery, Booth, Janney & Varney
ATTYS

D. E. KEMPSTER.
HANDLE OR BAIL MAKING MACHINE.
APPLICATION FILED NOV. 6, 1912.

1,070,696.

Patented Aug. 19, 1913.

8 SHEETS—SHEET 4.

WITNESSES
Horace A. Crosman.
Carl L. Choate.

INVENTOR
Daniel E. Kempster
BY
Emery, Booth, Janney & Varney
ATTYS

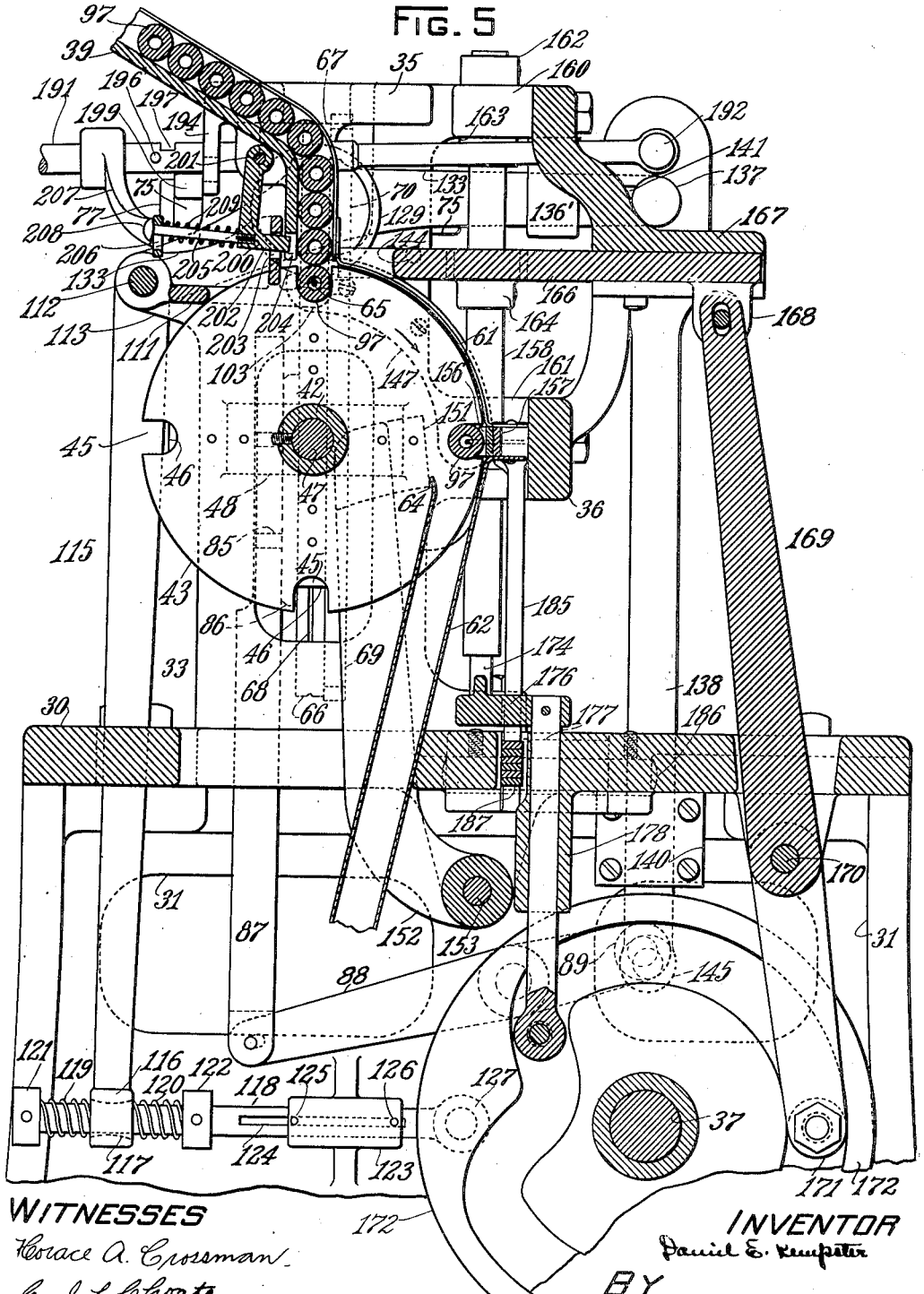

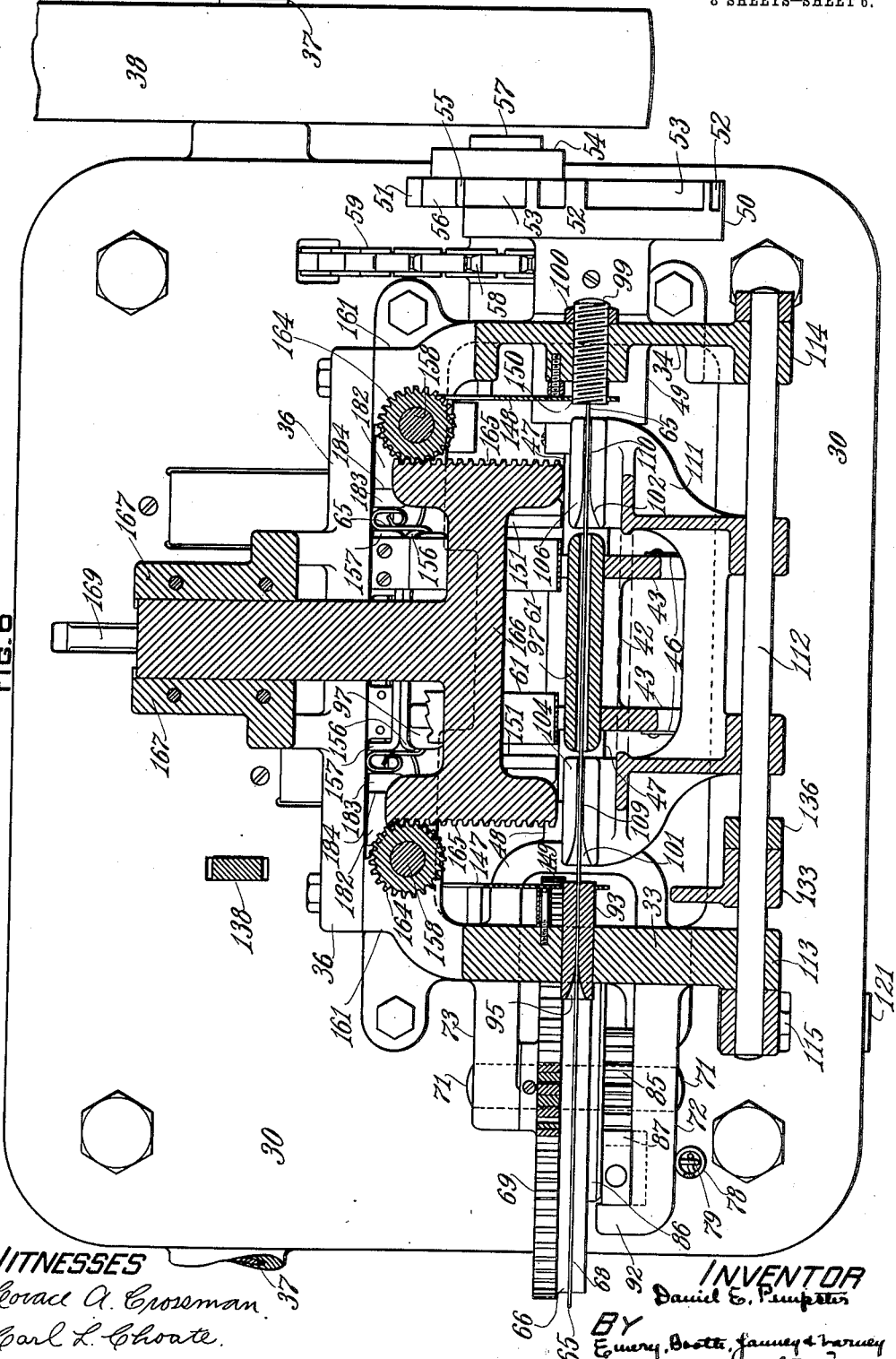

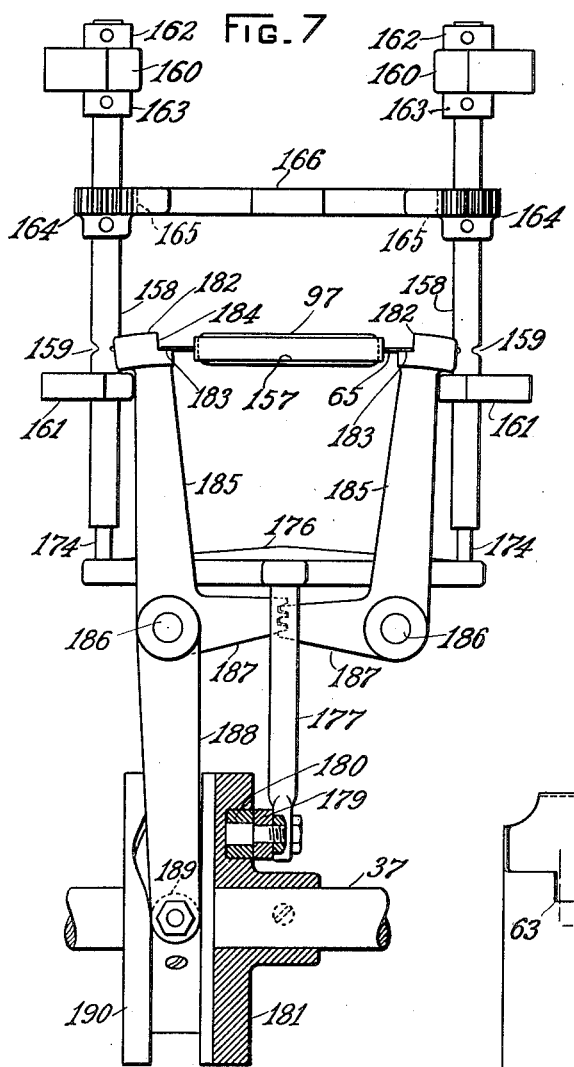
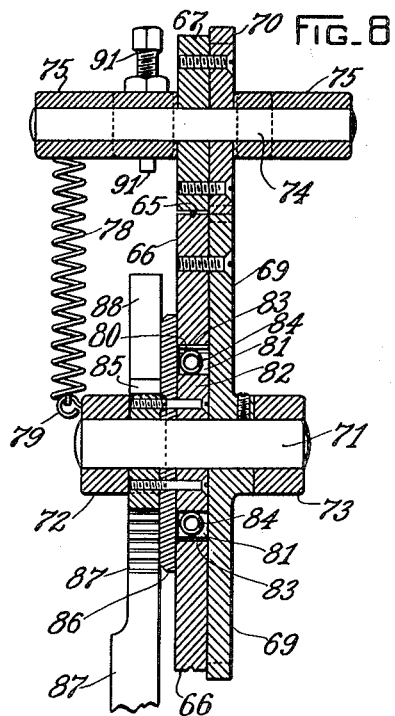
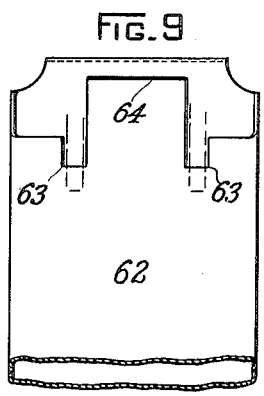
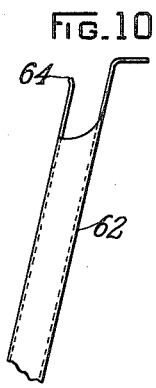

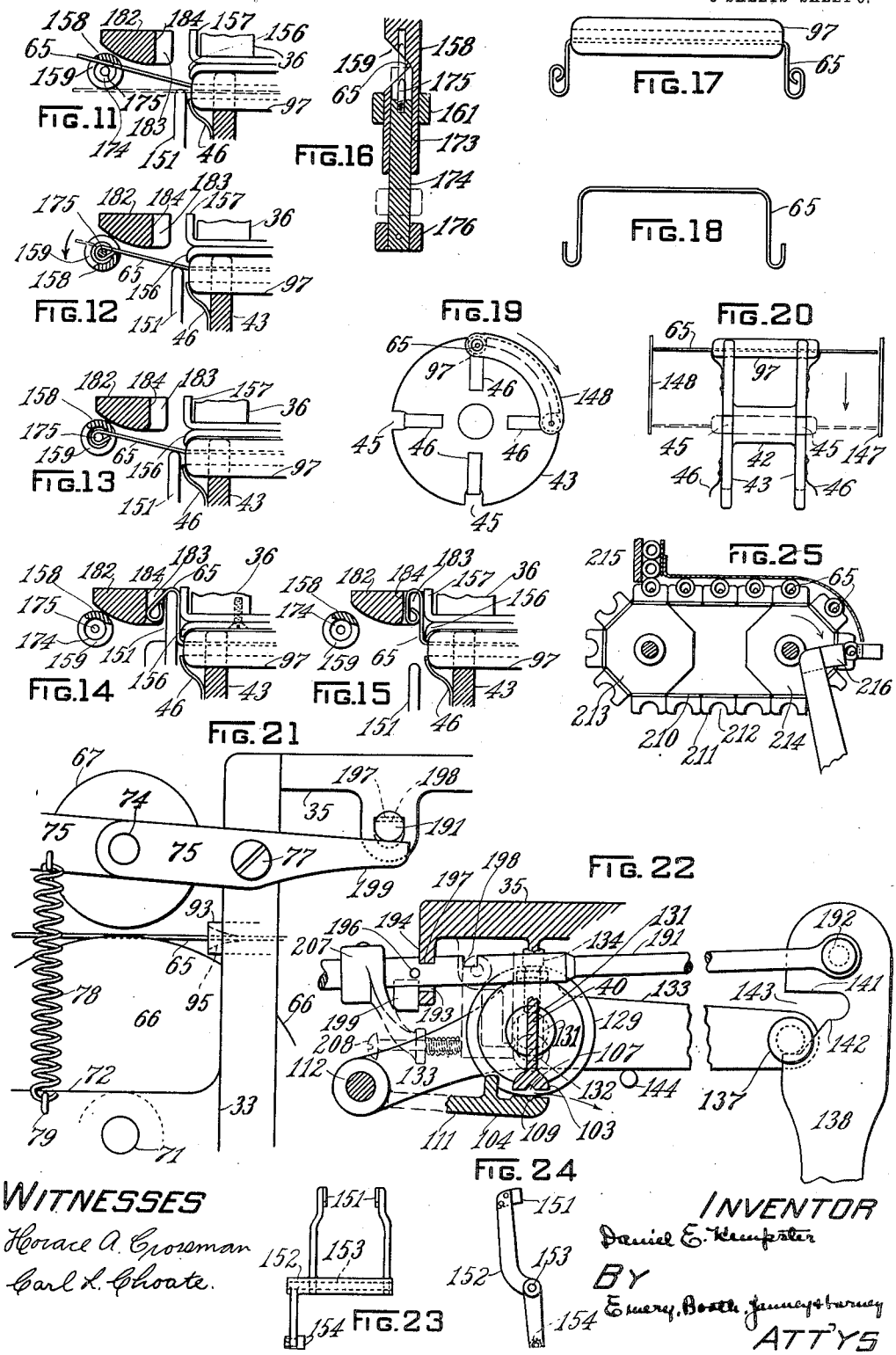

UNITED STATES PATENT OFFICE.

DANIEL E. KEMPSTER, OF BOSTON, MASSACHUSETTS.

HANDLE OR BAIL MAKING MACHINE.

1,070,696.　　　　　　Specification of Letters Patent.　　Patented Aug. 19, 1913.

Application filed November 6, 1912. Serial No. 729,762.

*To all whom it may concern:*

Be it known that I, DANIEL E. KEMPSTER, a citizen of the United States, and a resident of Boston, county of Suffolk, and State of Massachusetts, have invented an Improvement in Handle or Bail Making Machines, of which the following description, in connection with the accompanying drawings, is a specification, like characters on the drawings representing like parts.

This invention relates to handle or bail making machines, and more particularly, though not exclusively, to machines for assembling wires with handles, and bending the ends of the wires which project from the ends of the handles.

My invention will be best understood by reference to the following specification, when taken in connection with the accompanying illustration of one specific embodiment thereof, while its scope will be more particularly pointed out in the appended claims.

Figure 1:
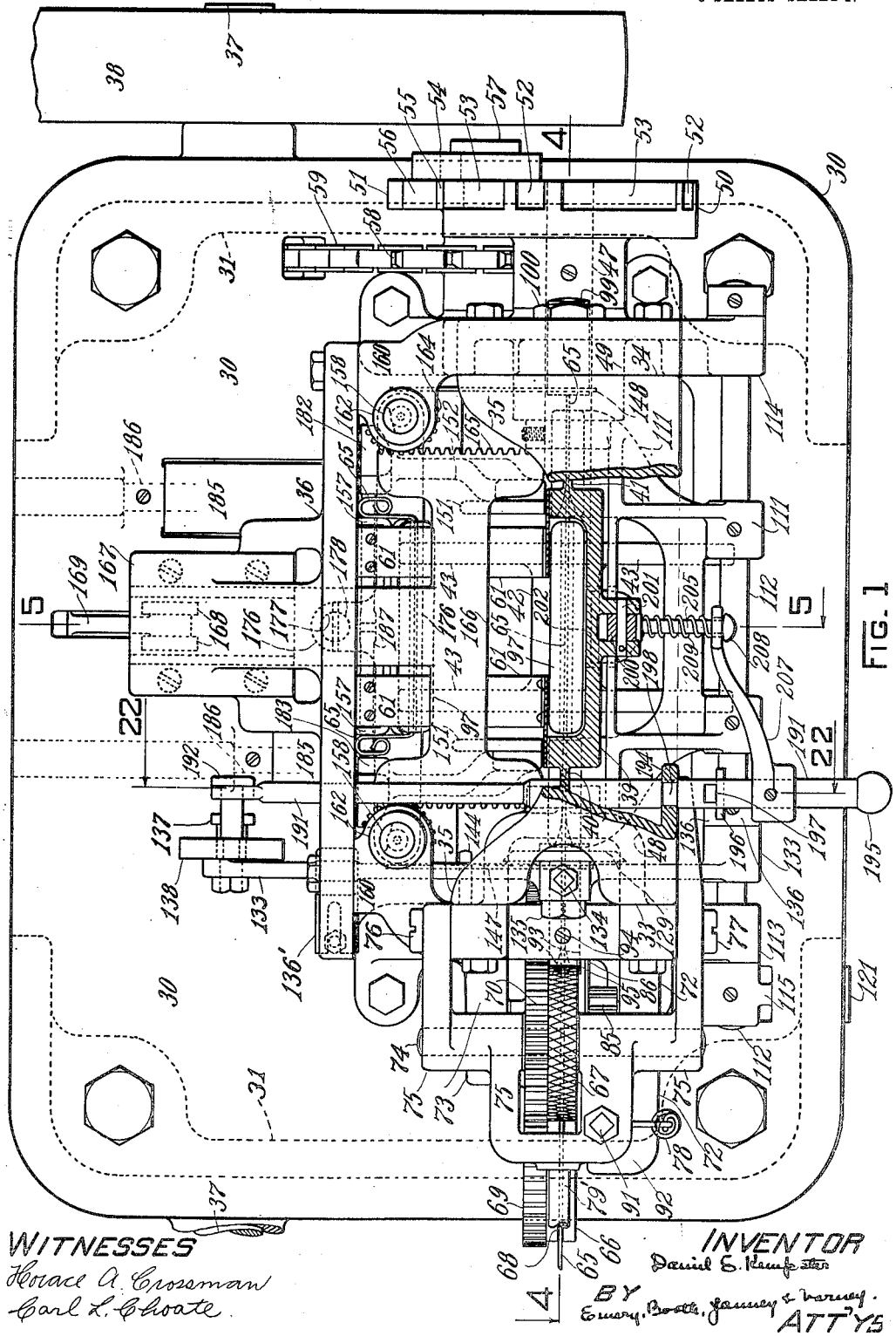
Figure 2:
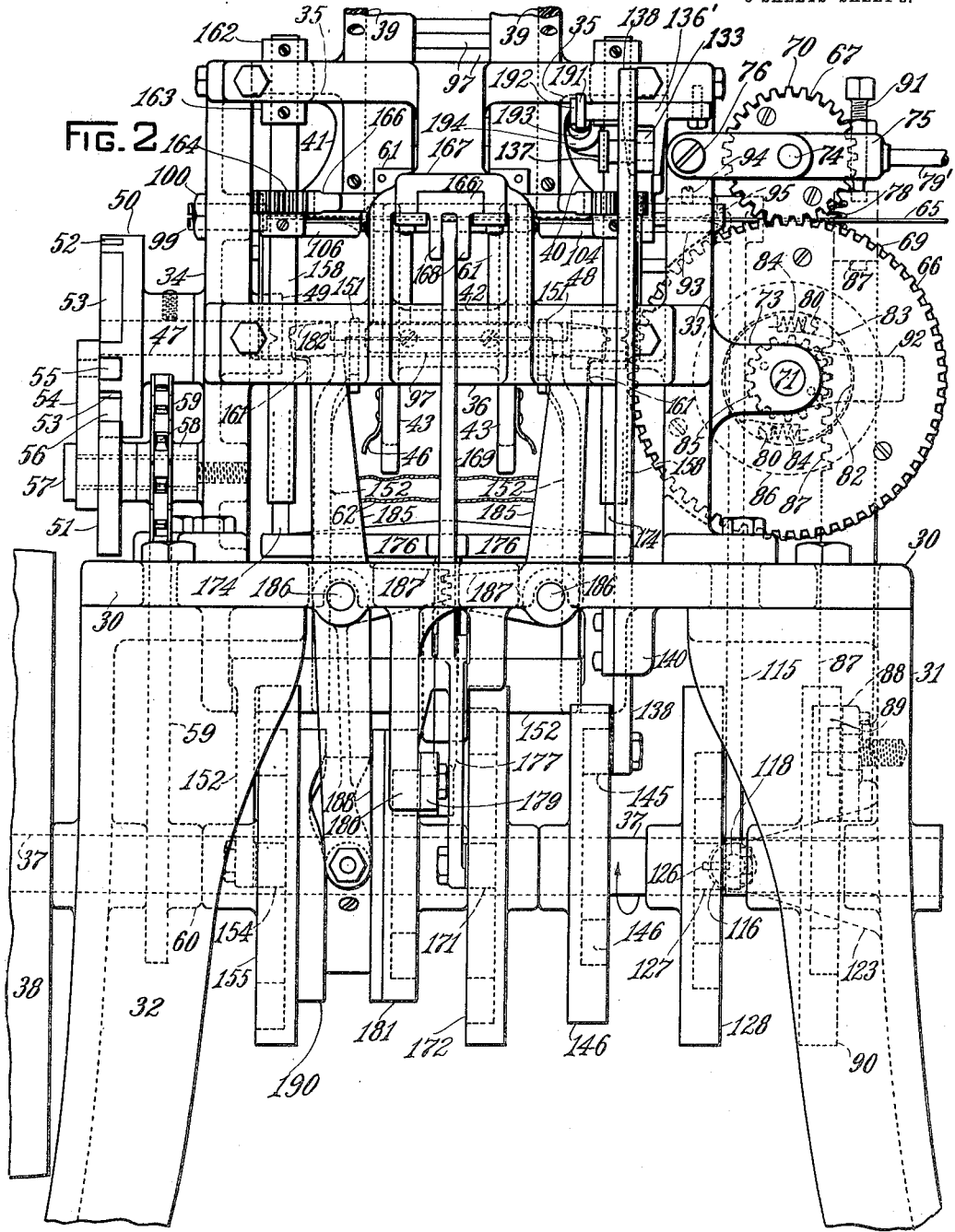
Figure 3:
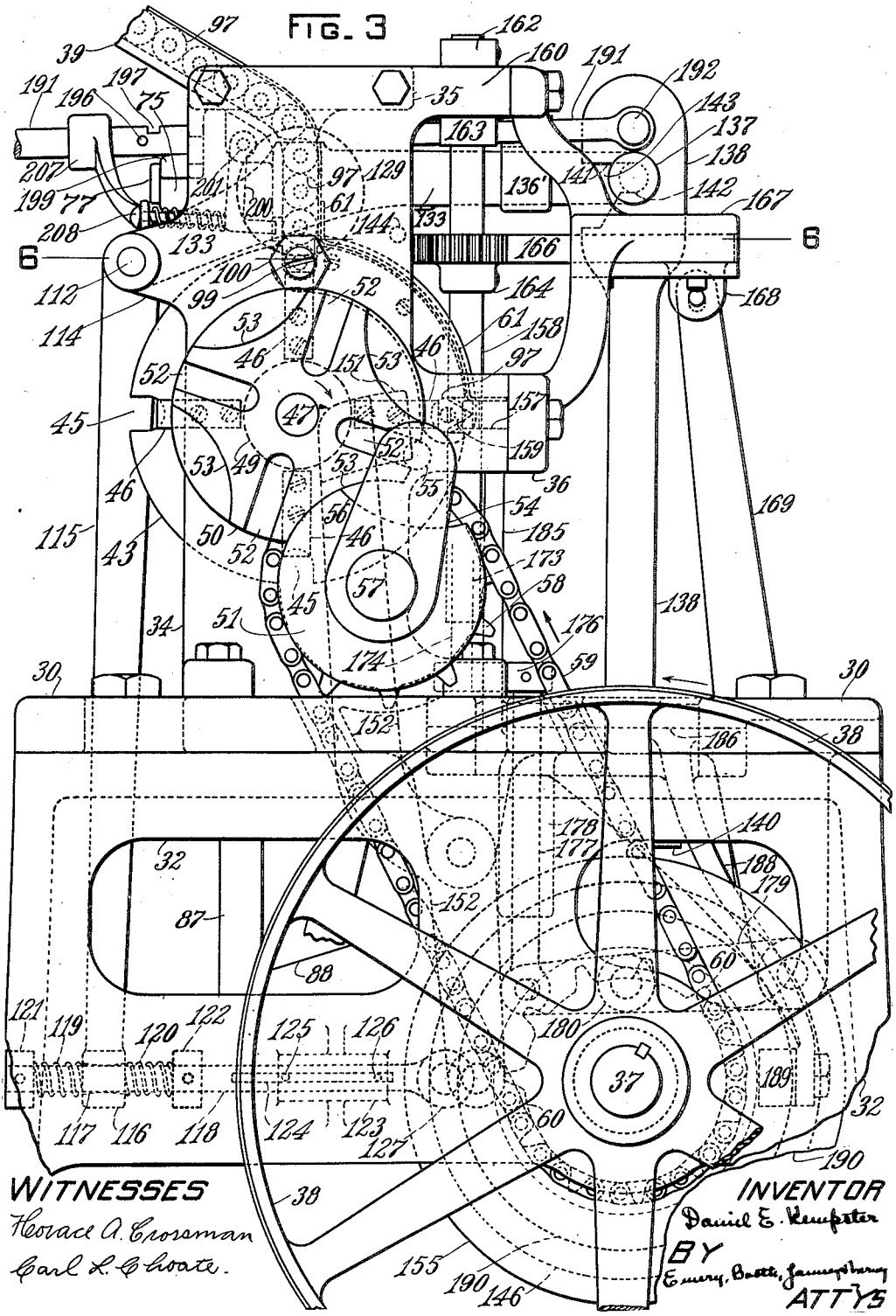
Figure 4:
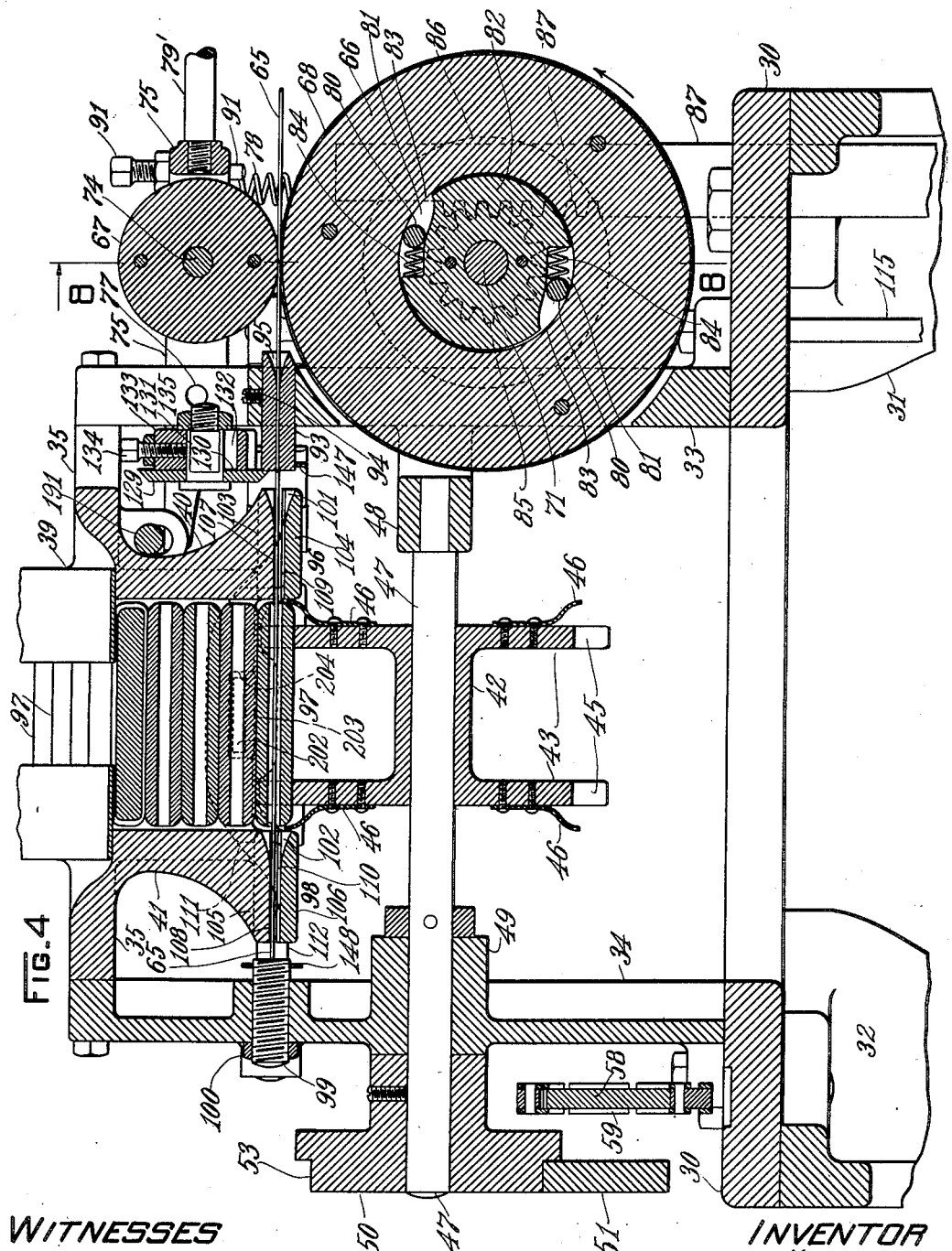

In the drawings: Figure 1 is a plan, partly in section, of a handle machine embodying my invention; Fig. 2 is a rear elevation of the machine; Fig. 3 is an elevation of the machine, viewed from the left-hand side of Fig. 2; Fig. 4 is a sectional view on line 4—4 of Fig. 1, looking in the direction of the arrow on said line; Fig. 5 is a section on line 5—5 of Fig. 1, looking in the direction of the arrow on said line; Fig. 6 is a plan section on line 6—6 of Fig. 3; Fig. 7 is a detail elevation, partly in section, of a portion of the wire coiling and bending mechanism; Fig. 8 is a detail sectional view on line 8—8 of Fig. 4, looking in the direction of the arrow; Fig. 9 is a detail front elevation of a portion of the handle chute; Fig. 10 is a detail side elevation of the handle chute shown in Fig. 9; Figs. 11 to 15, inclusive, are detailed plan sections, illustrating the various steps in the coiling and bending of one end of the wire which projects from the handle, it being understood that the coiling and bending operations at the other end are exactly similar; Fig. 16 is a detail central vertical section of one of the wire coilers; Fig. 17 is an elevation of one of the completed handles; Fig. 18 is an elevation of another form of handle, or bail, in which coiling of the extremities of the wires is omitted; Figs. 19 and 20 are side and front elevations, respectively, of the rotary handle carrier for transferring the wired handle from the feed-path of the handle wiring mechanism into position to be operated upon by the wire-bending mechanism, this view also showing the segmental guides which hold the wire against endwise movement within the handle; Fig. 21 is a detail front elevation of a portion of the wire feeding mechanism, illustrating particularly the connection between the idle feed-roll and the actuating rod of the stop motion; Fig. 22 is a detail sectional view, partly in elevation, on line 22—22 of Fig. 1, illustrating the stop motion; Figs. 23 and 24 are front and side elevations, respectively, at a much reduced scale, of the wire-bending lever and wire-benders which bend the ends of the wire at right angles to the handle; and Fig. 25 is a detail side elevation, partly in section, of a modification of the handle carrier in connection with the handle-feeding race-way and wire-bending mechanism.

Referring to the drawings, and to the embodiment of my invention which I have there shown for illustrative purposes, the machine is provided with a suitable frame to support the working parts, and herein comprising a table, or base, 30, mounted upon legs 31 and 32, and having a structure comprising a pair of uprights 33 and 34, the latter being joined to each other by horizontal tie members 35 and 36. Journaled in suitable bearings in the legs 31 and 32, is a main driving shaft 37, having secured thereto a pulley 38, which may be connected to any suitable source of power (not shown) to drive the machine.

*Handle feeding mechanism.* (See Figs. 1 to 5, inclusive).—The machine may be provided with any suitable handle-delivering means, herein in the form of a race-way 39 for delivering a succession of the handles from the source of supply (not shown) to the handle carrying means. The cross member 35 of the frame is provided with a pair of depending guides 40 and 41, constituting in effect a portion of the race-way 39, and serving as guides for the ends of the handles (see Fig. 4). The handles are delivered in succession to suitable handle-carrying means, which may, if desired, take the form of a rotary handle-carrier 42, comprising a pair of disks 43—43 having suitable handle-receiving formations, said disks being herein provided with one or more (herein four) pairs of suitable handle-receiving impressions or notches 45—45. The handle-carrier may be provided with any suitable means to hold the handles against endwise movement therein, but herein is provided with a plurality of pairs of stops 46—46, secured to the sides of the disks 43—43, respectively, and arranged to engage the ends of the handles.

The handle carrier may be driven by any suitable means to move the same forward in one direction to carry the handles from the wire-feeding means hereinafter described, and present them to the wire-bending means hereinafter described. Herein, the handle carrier is secured to a shaft 47 journaled in suitable bearings 48 and 49 in the uprights 33 and 34, respectively. An intermittent rotary motion is imparted to the shaft by suitable intermittent gearing, herein comprising a driven member 50, and a driving member 51, both of common form. The driven member is provided with a plurality of radial slots 52 and a plurality of arc-shaped depressions 53, corresponding in number to the number of handle-receiving depressions 45 in the handle carrier. The driving member 51 is provided with a crank-arm 54 having a crank-pin 55 arranged to enter the slots 52 (see Fig. 3) successively, and thus rotate the driven member 50 a quarter of a rotation with each rotation of the driving member. The driving member 51 is preferably in the form of a disk formed on an arc of a circle of the same radius as the arc-shaped depression 53 of the driven member, and adapted to coöperate therewith to lock the latter against accidental rotation between the periods of motion imparted thereto by the crank-pin 55. The driving member 51 is provided with an arc-shaped depression 56, which serves to allow the driven member to be rotated at intervals under the influence of the crank-pin, in a manner which is too well-known to require further description. The driving member 51 is herein journaled on a stud 57, the latter being secured to the upright 34. Secured to the member 51 is a sprocket wheel 58, connected by a chain 59 to a sprocket wheel 60, the latter being secured to the main driving shaft 37. Assuming that the pulley 38 is driven in the direction of the arrow thereon (Fig. 3), the handle carrier 43 will be intermittently rotated 90 degrees at a time in the direction of the arrow thereon (Fig. 5), and will carry the handles in succession from the bottom of the race-way, where they are wired, 90 degrees to the point where the wires are bent, after which it carries the handles still farther and discharges them. During this feeding movement of the handles, they may be held in place in the carrier by means of a pair of fixed guards 61, formed concentric with the periphery of the carrier. While the handles may be discharged from the handle carrier without the use of a chute, I preferably provide a handle chute 62 (see Figs. 5, 9 and 10), herein in the form of a tube of regular cross section, suitably supported upon the cross member 36 of the frame. Herein, one wall of the upper portion of the chute is provided with a pair of notches 63—63 to receive the peripheries of the disks 43 of the handle carrier, and is further provided with a tongue 64, which projects between said disks, and serves as a means for positively withdrawing the handles from the handle carrier, by acting upon the handle after the manner of a wedge, as will be evident from an inspection of Fig. 5.

It will now be evident that the described mechanism provides a means for successively holding the handles at the bottom of the race-way in position to be wired, and positively feeding the handles in succession from the wire inserting means and presenting them to the wire-bending means, and finally positively discharging the completed handles into the chute. In this way, the feeding of the handles is not dependent upon gravity, except in the race-way, and the machine can be rotated at high speed, and will feed the succession of handles positively and with great rapidity.

*Wire feeding, guiding and cutting mechanism.* (See Figs. 2, 4, 8, 19, 20, 21 and 22).—While the wire may be fed by any suitable means, I preferably employ the mechanism which I will now describe. A wire 65 passes between a pair of feed rolls, herein a driving feed-roll 66 and a driven feed-roll 67, the former being preferably provided with a groove 68 to receive the wire. The driven feed-roll 67 may, if desired, be knurled on its periphery (see Fig. 1), to afford a gripping surface. Preferably, the feed-rolls are geared together, so as to be positively rotated in unison, the driving feed-roll 66 for that purpose being herein provided with a gear 69 secured thereto, and the driven feed-roll 67 being provided with a pinion 70, secured thereto and meshing with the gear 69. The gear 69 is secured in any suitable manner to a shaft 71, journaled in suitable bearings 72 and 73 on the upright 33 (see Figs. 2 and 8). The feed-roll 67 and pinion 70 are loosely mounted upon a shaft 74 in a yoke 75, the latter being mounted on pivots 76 and 77 on the upright 33 (see Figs. 1 and 2). Herein the yoke 75 is connected by a spring 78 to a fixed pin 79, said spring serving as a means of yieldingly pressing the feed-roll 67 on the wire therebeneath. If desired, the yoke 75 may be provided with a grasping handle 79', by means of which the upper feed-roll may be manually lifted to stop the feed of the wire.

The feed-roll 66 may be driven by any suitable means, but herein is provided with a ball or roller driving clutch of common form, comprising a plurality of balls or rollers 80, located in recesses 81 provided in a disk 82 loosely mounted upon the shaft 71. This disk, together with the balls or rollers 80, is placed within a central aperture 83 in the feed-roller 66, and the balls or rollers are wedged into driving engagement with the circumferential surface of the aperture in the well-known manner by springs 84—84. When the disk 82 is rotated contra-clockwise (Fig. 4), the roller clutch of which it forms a part will serve to rotate the feed roller 66 therewith, but when the disk is rotated in the opposite direction, the feed-roller will remain fixed.

While the disk 82 may be rotated alternately in opposite directions by any other suitable means, it is herein fixed to a pinion 85, and there is preferably provided an interposed disk 86, the latter serving as a cover for the roller clutch mechanism. The pinion 85 meshes with a rack 87, which is pivotally connected to a cam lever 88, having journaled thereon a cam roll 89 actuated by a suitable cam 90 (see Fig. 2) secured to the main driving shaft 37. By the described mechanism, the feed-rolls are given an intermittent feeding motion in the proper direction to feed the wire into and through the handle. As a means for determining and varying within reasonable limits the length of wire which shall be fed at each feeding movement, there may be provided a stop-screw 91 threaded into the yoke 75 (see Figs. 1 and 2), and depending a short distance therebelow to be engaged by the upper extremity of the rack 87, which is thus utilized to lift the upper feed-roll at the proper moment in the operation of the machine, and thus cause a discontinuance of the feeding movement of the wire. By suitably adjusting the screw 91, the extent of the feeding movement may be varied within reasonable limits, as before stated. Herein the plunger 88 is provided with a guide 92 (see Figs. 2 and 6), which serves to guide the same and maintain the engagement of the rack 87 with the pinion 85. The wire, after passing between the feed-rolls, may pass through and be guided by a guide 93, adjustably secured to the upright 33 by a set-screw 94. The guide 93 is preferably provided with a flaring entrance or mouth 95, to facilitate the entrance of the wire. The advancing end of the wire, after passing through the guide 93, passes into and through a wire guide 96 (see Fig. 4), thence through a handle 97 at the bottom of a column of handles in the race-way, and thence through a wire guide 98 at the opposite end of the handles, the end of wire bringing up against an adjustable stop 99, herein in the form of a screw threaded into the upright 34, and provided with a nut 100 for securing the screw in the selected position of adjustment. Herein the guide 96 is provided with a flaring entrance, or mouth, 101, and the guide 98 is similarly provided with a flaring entrance, or mouth, 102, to facilitate the entrance of the wire. Herein the guides 96 and 98 are each in two parts, that is to say, the guide 96 is composed of a fixed part 103 (see Fig. 4), and a relatively movable part 104, and the guide 98 is composed of a fixed part 105 and a relatively movable part 106. For convenience of manufacture, the guide parts 103 and 105 are formed on the depending guides 40 and 41 respectively, which guide the ends of the handles. The guides 103 and 105 are provided with grooves 107 and 108, and the movable guides 104 and 106 are similarly provided with complementary grooves 109 and 110. Herein the guide parts 104 and 106 are suitably formed on a yoke 111 (see Fig. 6), secured to a rock-shaft 112, the latter being mounted in suitable bearings 113 and 114 in the uprights 33 and 34, respectively. When this yoke is lifted, the grooves 109 and 110 therein coöperate with the grooves 107 and 108, forming passages to guide and hold the work in a central position with relation to the hole in the handle 97 at the bottom of the column in the race-way, but after the wire has been severed, as will presently appear, the yoke is lowered into the position shown in the drawings, thus freeing the terminal portions of the wire and allowing the wire and its handle to be carried by the handle carrier into position to be acted upon by the wire-bending mechanism. In order to facilitate the escape of the wire, the grooves 107, 108, 109 and 110 are preferably V-shaped, as shown in Fig. 22.

A rocking motion is imparted to the yoke 111 at appropriate times in the operation of the machine by a lever 115, secured to and depending from the rock-shaft 112, and having at its lower end a boss 116 provided with an aperture 117, through which a sliding rod 118 passes. Encircling this rod are two helical springs 119 and 120, bearing against opposite sides of the boss 116, and held under compression by collars 121 and 122, secured to the rod 118. This provides a yielding connection between the rod 118 and the lever 115, so that the yoke 111 will be capable of pressing upwardly with a yielding pressure against the guide parts 103 and 105, and also capable of yielding downwardly to permit the wire to be forced laterally out of the grooves in the yoke, in case any accident should arise which would make this necessary. The rod 118 is mounted to slide in a guide 123 and is provided with a slot 124, which receives pins 125 and 126, passing through said guide 123, said pins serving to keep said rod from rotating in said guide. Journaled on a rod 118 is a cam roll 127, actuated by a suitable cam 128 secured to the driving shaft 37.

I will now describe the mechanism by means of which the wire, after being fed into the handle, is severed. The wire guide 93 hereinbefore described, constitutes a fixed cutter, with which a movable cutter 129 coöperates. Herein the movable cutter 129 is in the form of a disk, having a flat face 130, lying in the same plane as the inner end of the guide 93. The cutter 129 is mounted on a stud 131, the latter passing through a slot 132 in a cutter lever 133. An adjusting screw 134 threaded into the lever 133 bears at its lower end against the stud 131, and serves as a means for adjusting the latter longitudinally of the slot 132. The stud may be secured in the selected position of adjustment by means of a clamping nut 135, secured thereto. By this means, the cutter 129 is so mounted as to be capable of adjustment vertically, as well as adjustment about its axis, the advantage being that as the cutter becomes dulled at any point in its periphery, it may be rotated a short distance to present a fresh cutting surface. Such adjustment of the cutter may take place from time to time until the condition of the edge makes it necessary to regrind the cutter, and such regrinding will of course necessitate a vertical adjustment of the same on its actuating lever. Herein the cutter lever 133 is fulcrumed on the rockshaft 112, the latter being provided with a fixed collar 136 (see Fig. 6), to hold said lever against sliding movement on said rock-shaft. The other end of the lever 133 may be mounted to slide in a forked guide 136$^1$ (see Figs. 2, 3 and 5). By this means, the cutter is maintained in its proper coöperative position, with respect to the wire guide and cutter 93.

The cutter lever 133 may be actuated by any suitable means, but herein is provided with a stud 137 suitably connected to a vertically movable link 138, the latter being mounted in a guide 140, which allows the same to slide vertically and play forward and back at its upper end to a certain extent. Herein, the link 138 is provided with a notch 141 to receive the stud 137, said notch having a narrow inner end 142 adapted to closely fit the stud, so that when the latter is located therein, and the link 138 is reciprocated vertically, a rocking motion will be imparted to the cutter lever 133 and the cutter 129 carried thereby. The notch 141, however, is provided with a wide entrance 143, which is equal to, or greater in vertical extent than, the vertical travel of the link 138, for a purpose which will be described hereinafter in connection with the stop motion. The pin 144, secured to the upright 33 serves to limit the downward movement of the lever 133. The vertically movable link 138 carries at its lower end a cam-roll 145 actuated by a suitable cam 146, secured to the main driving shaft 37. This cam acts through the link 138 to impart a rocking motion to the cutter lever 133, at appropriate intervals in the operation of the machine to cause the cutter 129 to sever the wire.

After the wire has been severed, and the length of wire in the handle is carried toward the wire-bending mechanism, it is desirable that there shall be provided some suitable means for holding the wire against longitudinal displacement in the handle. To this end, there are provided two guides 147 and 148, secured to the uprights 33 and 34, respectively. The guide 147 is provided with an aperture 149, through which the wire guide 93 extends, and the guide 146 is similarly provided with an aperture 150, through which the wire stop 99 extends. Herein the guides 147 and 148 are in the form of segmental plates (see Fig. 19), and are approximately 90 degrees in extent, so as to hold the wire against longitudinal displacement, while the latter is being carried from the position shown in full lines in Fig. 20 to the position shown in dotted lines therein.

*Wire bending mechanism.* (See Figs. 1, 2, 3, 5, 11 to 15 inclusive, and Figs. 23 and 24).—Located adjacent opposite ends respectively of the rotary handle carrier are two wire benders 151—151, herein in the form of plates secured to two arms of a lever 152, by means of which said plates are carried to and fro horizontally at appropriate times in the operation of the machine to bend the terminal portions of the wire in the handle. The lever 152 is herein mounted to rock on a shaft 153, and is provided with a depending arm carrying a cam-roll 154, the latter being actuated by a cam 155, secured to the main driving shaft 37 (see Fig. 2). The plates 151 first advance and bend the extremities of the wire in the handle into position to be engaged by the coilers hereinafter described, and after the ends of the wire have been coiled, the said plates bend the terminal portions of the wire at right angles to the handle, as will be described more fully hereinafter. Now, if there were nothing to prevent, the wire-bending plates 151 in bending the ends of the wires at right angles to the handle would cause the wire to be bent at and against the other end of the handle. This would be very undesirable for two reasons: In the first place, the handles would be very apt to split, while the wire is bent against the ends thereof, and in the second place, the handle would not afterward turn freely upon the wire. I therefore provide two abutments 156—156, which extend a short distance beyond the ends of the handle, and inwardly toward the axis thereof (see Figs. 11 to 15, inclusive). These abutments insure the bending of the wire at a short distance beyond the ends of the handle, thus preventing splitting of the latter, and moreover, allowing the handle to turn freely upon the wire, after the handle has been completed. When the final bending operation takes place, it is desirable that there shall be provided a pair of suitable abutments 157, bearing against the right angle portion of the wire to support the same when the loops are squeezed in by the final wire benders.

*Wire coiling mechanism.* (See Figs. 1, 2, 5, 6, 7, and 11 to 16, inclusive).—I will now describe the mechanism by means of which the extremities of the wire are coiled to form loops. Located adjacent the extremities of the wire are coilers in the form of shafts 158—158, provided with lateral notches or recesses 159—159, in which the terminal portions of the wire are bent by the plates 151 (see Figs. 11 to 16). These shafts are journaled in suitable bearings 160—160, respectively, at their upper ends, and bearings 161—161 just below the notches 159. Collars 162 and 163 secured to the shafts above and below the bearings 160, holding the shafts against vertical sliding movement therein. An oscillatory motion may be imparted to the shafts 158 by any other suitable mechanism, but herein there are secured to these shafts pinions 164—164 meshing with racks 165—165, the latter being formed on, or secured to, a slide 166, mounted to slide horizontally in guideways 167 in the cross member 36. The slide 166 is provided with a pair of depending ears 168, to which an actuating lever 169 is pivotally connected. This actuating lever is fulcrumed at 170, and carries a cam-roll 171, which is actuated by a suitable cam 172 secured to the main driving shaft 37. By the described mechanism, the coilers are given an oscillatory motion at appropriate times in the operation of the machine, as will be more fully described hereinafter.

Since the two coilers are exactly similar in construction, a detailed description of one will suffice for both. Referring to Fig. 16, the coiler shaft 158 is provided at its lower end with a central bore 173, in which a plunger 174 is mounted to slide vertically. Formed on, or suitably secured to, this plunger is a retaining pin 175, preferably having a somewhat rounded and tapered extremity. When this plunger is lifted from the position shown in full lines in Fig. 16 to the position shown in broken lines therein, this pin is carried across the V-shaped aperture 159, and serves as a means for retaining or locking the wire in the apex of the aperture, as will be evident by an inspection of Figs. 11 and 16. Now, it must be evident that with the wire thus held, the coiler shafts may be rotated, thereby causing the terminal portion of the wire to be coiled about the retaining pin 175 (see Figs. 12 and 13) in a manner which will be more fully described hereinafter.

The plungers 174 may be reciprocated vertically by any suitable means, but herein they are fixed to a yoke 176, the latter in turn being secured to a plunger 177 mounted to slide vertically in a guide 178 (see Figs. 5 and 7). The plunger 177 is pivoted to a cam lever 179, carrying a cam-roll 180 actuated by a suitable cam 181 (see Fig. 7). This cam acts through the described mechanism to reciprocate the retaining pins 175 at the proper times in the operation of the machine, and thus cause the wire to be locked to and unlocked from the coilers.

*Final bending mechanism.* (See Figs. 7, and 11 to 15 inclusive).—After the coilers have formed loops in the ends of the wire, the latter is then bent laterally at right angles to the handle by the wire-bending plates 151 hereinbefore described, and at the same time, the looped ends of the wire are bent inwardly somewhat. After the plates 151 have withdrawn, the loops are then bent inwardly still farther, until they contact with right angle bends just referred to. This final bending operation is herein accomplished by the use of a pair of benders 182, stepped or shouldered to provide supporting surfaces 183 for the wire, and lateral abutments or shoulders 184, which latter, as will presently appear, serve to bend the loops inwardly. These benders may be moved toward and away from each other to accomplish the bending operation by any suitable mechanism, but herein are suitably formed on, or secured to, a pair of levers 185—185, which are mounted on rock-shafts 186—186, and are caused to move in unison toward and away from each other, by the use of gear segments 187—187 on said levers meshing with each other (see Fig. 7). Secured to one of the rock-shafts 186 is a depending arm 188 carrying a cam-roll 189 actuated by a suitable cam 190, the latter being secured to the main driving shaft 37. This cam is adapted to impart to the benders 182 an appropriate motion to accomplish the final bending of the wire in a manner which will be more fully described hereinafter.

*Stop mechanism.* (See Figs. 1, 3, 5, 21 and 22).—I will now describe the mechanism by means of which the feed of the wire and handles may be stopped without stopping the main driving shaft of the machine, and the parts actuated thereby. A stop rod 191 is pivoted at 192 to the vertically movable link 138, and passes through an aperture 193 provided in an ear 194 formed on a cross-member 35. The front end of the stop rod may, if desired, be provided with a suitable handle, or knob, 195, which may be grasped to slide the rod through the aperture 193, thereby to swing the link 138 forward and back. A pin 196 secured to the rod (see Figs. 1 and 22), serves to limit the motion of the rod in the rearward direction, and thus determines the extent to which the link 138 may be swung rearwardly. When the link is moved to the rearward position shown in Fig. 22, the stud 137 of the cutter lever 133 is located in the wide entrance 143 of the notch 141 in the link 138. Consequently, when the link is reciprocated vertically, no motion will be imparted to the cutter lever. It will be understood that the link 138 is shown in Fig. 22 in its uppermost position, and since its stroke is approximately equal to the width of the widest portion of the notch 141, the cutter lever 133 will remain at rest upon its supporting pin 144.

As a means for locking the stop rod 191 in either of its two positions, it may be provided with notches 197 and 198, one of which will interengage with the ear 194, when the rod is in its rearward position, and the other of which will interengage with said ear when the rod is in its forward position. The rod may be held in such interengagement in any suitable manner, but herein the pivoted yoke 75, which carries the feed-roll 67 is provided with an arm 199, upon which the stop-rod 191 rests (see Figs. 21 and 22). When the rod is in its rearmost position, the depth of the notch 197 is such that the feed-roll 67 is held out of engagement with the wire 65 and is thus rendered ineffective to feed the latter. When, however, the stop rod is placed in its forward position, the depth of the notch 178 is such that the feed-roll 67 is pressed upon the wire by the action of the spring 78. It will now be evident that the wire feeding mechanism is rendered ineffective through the lifting of the feed-roll 67, and moreover, the movable cutter 129 carried by the cutter lever 133 is lowered across the passage in the wire guide 93, so as to prevent the wire from advancing.

As a means for stopping the feed of the handles from the race-way into the carrier, I may provide a handle stop 200 (see particularly Fig. 5), pivoted at 201. Herein this handle stop is L-shaped in form, and has a horizontal portion 202, which projects through an aperture 203 in the yoke 111, and through an aperture 204 in the turn of the race-way 39. Secured to the handle stop 200 is a pin 205, passing loosely through a slot 206 provided in the arm 207, the latter being secured to the stop rod 191. The pin 205 is provided at its extremity with a head 208 bearing against one side of the arm 207, while a spring 209 encircling said pin bears at one end against the other side of said arm and at its other end against the handle stop 200. It will now be evident that when the stop-rod 191 is moved to its rearward position, it will act through the arm 207 and spring 209 to force the handle stop 200 with spring pressure against the lowermost handle in the race-way, and thus stop the feed of the handles.

It will be understood that by placing the stop rod 191 in its rearmost position, the wire cutting mechanism, the wire feeding mechanism and the handle feeding mechanism, are rendered ineffective, yet without stopping the main driving shaft and parts carried thereby.

*General operation.*—Having thus specifically described the various mechanisms and their mode of operation, I will now describe their general operation and coöperative action. Assuming that a handle from the race-way has entered the handle carrier, the hole in the handle is then in the line of the wire feed, and the wire-feeding mechanism advances the wire the required distance until it brings up against the end stop. The movable cutter then descends and severs the wire. The wire-supporting yoke drops, thus releasing the terminal portion of the wire, whereupon the handle carrier starts to rotate, and carries the handle from the wire-feeding and cutting mechanism, and presents the same to the action of the bending and coiling mechanisms.

Referring now more particularly to Fig. 11, the wire is at first straight, as indicated in dotted lines in Fig. 11. The wire-bending plates 151 then advance, thus causing the terminal portions of the wire to be carried into the notches 159 of the coiler shafts 158. The retaining pins 175 now rise and lock the wire in the coilers, whereupon the latter are rotated from the position shown in Fig. 11 to the position shown in Fig. 13, thus forming loops in the ends of the wires. The retaining pins 175 now drop and release the loops, whereupon the wire bending plates 151 advance to the position shown in Fig. 14, thus bending the terminal portions of the wire at right angles to the handle, and at the same time causing the looped end of the wire to engage the rounded corners of the final wire benders 182. This causes the loops to be bent inwardly somewhat, as shown in Fig. 14. The wire-bending plates 151 then recede to the position shown in Fig. 15, and the final wire benders 182 close in toward each other, and bend the loops inwardly until they touch the right-angle portions of the wire. At this time, the hooks thus formed upon the wire rest upon the supporting surfaces 183, and the wire is consequently held in a horizontal plane and prevented from swinging around into a vertical plane. The handle now being completed, the final wire benders 182 move apart, the carrier again starts to rotate, and the completed handle is carried into the chute 62 and discharged. The succeeding handles are operated upon in the same way, and successively discharged into the chute the same as the first.

Referring now to Fig. 25, I have shown therein a modification of the handle carrier in which the principle is precisely the same as in the form already described, the carrier in this case, however, being in the form of a belt, or chain, 210, carrying a plurality of blocks, or links, 211, having handle-receiving depressions 212. This chain, or belt, is mounted on suitable driving members 213 and 214, by means of which the handle carrier is moved in the proper direction to feed a succession of handles from a race-way 215 to wire bending devices 216, it being understood that the latter as well as the remaining elements will be of the same, or similar, construction as the form of the invention already described. In this modification also, the carrier moves the handles forward always in one direction, and positively feeds them from the wire-feeding means and presents them to the wire-bending means.

While I have herein shown and described two specific embodiments of my invention for illustrative purposes, and have disclosed and discussed in detail the construction and arrangement incidental to two specific applications thereof, it is to be understood that the invention is limited neither to the mere details or relative arrangement of parts, nor to its specific embodiments herein shown, but that extensive deviations may be made from the illustrated forms or embodiments of the invention, without departing from the principles thereof.

Having thus described my invention, what I claim and desire by Letters Patent to procure is:

1. A machine of the class described having in combination, handle-delivering means, wire-feeding means, wire-bending means, a handle-carrier, and means to move said handle carrier forward always in one direction to carry the handles from the wire-feeding means to the wire-bending means.

2. A machine of the class described having in combination, handle-delivering means, wire-feeding means, wire-bending means, a handle-carrier, and means to impart a step-by-step forward movement always in one direction to said handle-carrier to carry the handles from the wire-feeding means and present them to the wire-bending means.

3. A machine of the class described having in combination, a handle-carrier, a handle raceway to hold a succession of handles and deliver them one-by-one to said handle-carrier, wire-feeding means to feed wire into said handles, wire-bending means, and means to move said handle-carrier always in one direction to carry the handles from the wire-feeding means and present them to the wire-bending means.

4. A machine of the class described having in combination, handle-supply means, wire-inserting means, wire-bending means, and means positively to feed a succession of the handles always in one direction from the wire-inserting means and present them in succession to the wire-bending means.

5. A machine of the class described having in combination, handle-carrying means having provision to hold a plurality of handles, means to insert a wire in one of said handles, means contemporaneously to bend a wire in another of said handles, and means to move said carrier always in one direction to carry the handles from the wire-inserting means and present them to the wire-bending means.

6. A machine of the class described having in combination, a rotary handle-carrier provided with a plurality of handle-receiving formations, means to insert a wire in one of the handles held by said carrier, means to bend a wire in another of the handles held by said carrier, and means to rotate said carrier to carry the handles from the wire-inserting means and present them to the wire-bending means.

7. A machine of the class described having in combination, means for feeding the handles, means for inserting wire into the handles, and means at will to stop the feed of the handles.

8. A machine of the class described having in combination, a handle raceway, means to feed the handles from the raceway, means for inserting wire into the handles, and means at will to stop the feed of the handles from the raceway to said handle feeding means.

9. A machine of the class described having in combination, means for feeding the handles, means for feeding wire into the handles, and means at will to stop the feed of the handles and the feed of the wire.

10. A machine of the class described having in combination, means for feeding the handles, means for feeding wire into the handles, means for cutting the wire, and means at will to stop the feed of the handles, the feed of the wire, and the cutting of the wire.

11. A machine of the class described having in combination a handle raceway, means to feed the handles away from the raceway, means for inserting wire into the handles, a handle stop mounted to move transversely of the path of the handles in said raceway and means at will to move said stop into or out of the path of the handles.

12. A machine of the class described having in combination, means for feeding the handles, wire-feeding means including a feed-roll for feeding wire into the handles, and means for stopping the feed of the handles and moving said feed roll out of feeding engagement with the wire.

13. A machine of the class described having in combination, means for feeding the handles, means for feeding wire into the handles, wire cutting means including a cutter movable across the path of the wire, and means for stopping the feed of the handles, the feed of the wire, and placing said cutter across the path of the wire.

14. A machine of the class described having in combination, means for feeding the handles, means for feeding wire into the handles, wire-cutting means including a cutter and a cutter actuator, and means for stopping the feed of the handles, the feed of the wire, and disconnecting said actuator from said cutter.

15. A machine of the class described having in combination, means for feeding the handles, wire-feeding means, including a feed-roll for feeding wire into the handles, a spring normally holding said feed-roll in feeding engagement with the wire, and means at will to stop the feed of the handles and move the feed-roll against the tension of said spring out of feeding engagement with the wire.

16. A machine of the class described having in combination, a handle raceway, means to feed handles from the raceway, means for inserting wire into the handles, and means including a spring-pressed handle-stop for stopping the feed of the handles from said raceway to said handle-feeding means.

17. A machine of the class described having in combination, a handle-carrier for the handles, means on said carrier to hold the handles against endwise movement, means to impart a feeding movement to said carrier, and means to insert wire endwise into said handles.

18. A machine of the class described having in combination, a rotary handle-carrier, means on said carrier to hold the handles against endwise movement, means to rotate said carrier, and means to insert wire endwise into the handles while held in said carrier.

19. A machine of the class described having in combination, means for feeding the handles, wire-feeding mechanism including a feed-roll for feeding wire into the handles, means including a reciprocating member for rotating said feed-roll, and means actuated by said member to move said feed-roll out of feeding engagement with the wire.

20. A machine of the class described having in combination, means for feeding the handles, means for feeding wire into a handle, a separable wire guide for guiding the wire into the handle, and means for opening said wire guide to release the wire therein.

21. A machine of the class described having in combination, a carrier for the handles, means for feeding wire into a handle, two separable wire guides at opposite ends, respectively, of the handle, and means for opening said wire guides to release the wire therein.

22. A machine of the class described having in combination, a carrier for the handles, means for feeding wire into a handle in said carrier, two separable wire guides at opposite ends, respectively, of the handle, means for opening said wire guides to release the wire therein, and means for moving said carrier to carry said handle transversely and carry said wire transversely out of said guides.

23. A machine of the class described having in combination, a carrier for the handles, means for feeding wire into a handle in said carrier, two separable wire guides at opposite ends, respectively, of the handle, and means for moving said carrier to carry said handle transversely and carry said wire transversely out of said guides.

24. A machine of the class described having in combination, a carrier for the handles, means for feeding wire into a handle in said carrier, two separable wire guides at opposite ends, respectively, of the handle, yielding means tending to close said wire guides, and means for moving said carrier to carry said handle transversely and carry said wire transversely out of said guides.

25. A machine of the class described having in combination, means for inserting a wire in a handle, means for feeding said handle transversely with said wire therein, means to hold said wire against longitudinal displacement in said handle, during the feeding movement, and means subsequently to shape the terminal portions of the wire.

26. A machine of the class described having in combination, means for inserting a wire in a handle, a rotary carrier for said handles, means for rotating said carrier to carry said handles transversely, and means to hold said wire against longitudinal displacement in said handle during the rotation of said carrier.

27. A machine of the class described having in combination, means for inserting a wire in a handle, means for bending the projecting portions of said wire laterally, and means subsequently to shape and to support the laterally bent portion of the wire.

28. A machine of the class described having in combination, means for inserting a wire in a handle, means for bending the projecting portions of said wire laterally, and means subsequently to shape and to hold said wire against turning movement in said handle.

29. A machine of the class described having in combination, means for inserting a wire in a handle, and wire-bending means for bending the projecting portions of the wire, said wire-bending means including a pair of members having shoulders to support the wire, and means relatively to actuate said members to shape the wire.

30. A machine of the class described having in combination, means for inserting a wire in a handle and wire-bending means for bending the projecting portions of the wire, said wire-bending means including a pair of wire-benders having vertical wire-bending shoulders, and horizontal wire-supporting shoulders, and means relatively to actuate said members to shape the wire.

In testimony whereof, I have signed my name to this specification, in the presence of two subscribing witnesses.

DANIEL E. KEMPSTER.

Witnesses:
   LOUIS A. JONES,
   CHAS. L. STUART.